Nov. 27, 1951  W. R. HOLMES  2,576,117
CONTROL SYSTEM AND DEVICE FOR DYNAMOELECTRIC MACHINES
Filed Oct. 10, 1945  2 SHEETS—SHEET 1

INVENTOR
WILLIAM R. HOLMES
BY Herbert Lor Davis
ATTORNEY

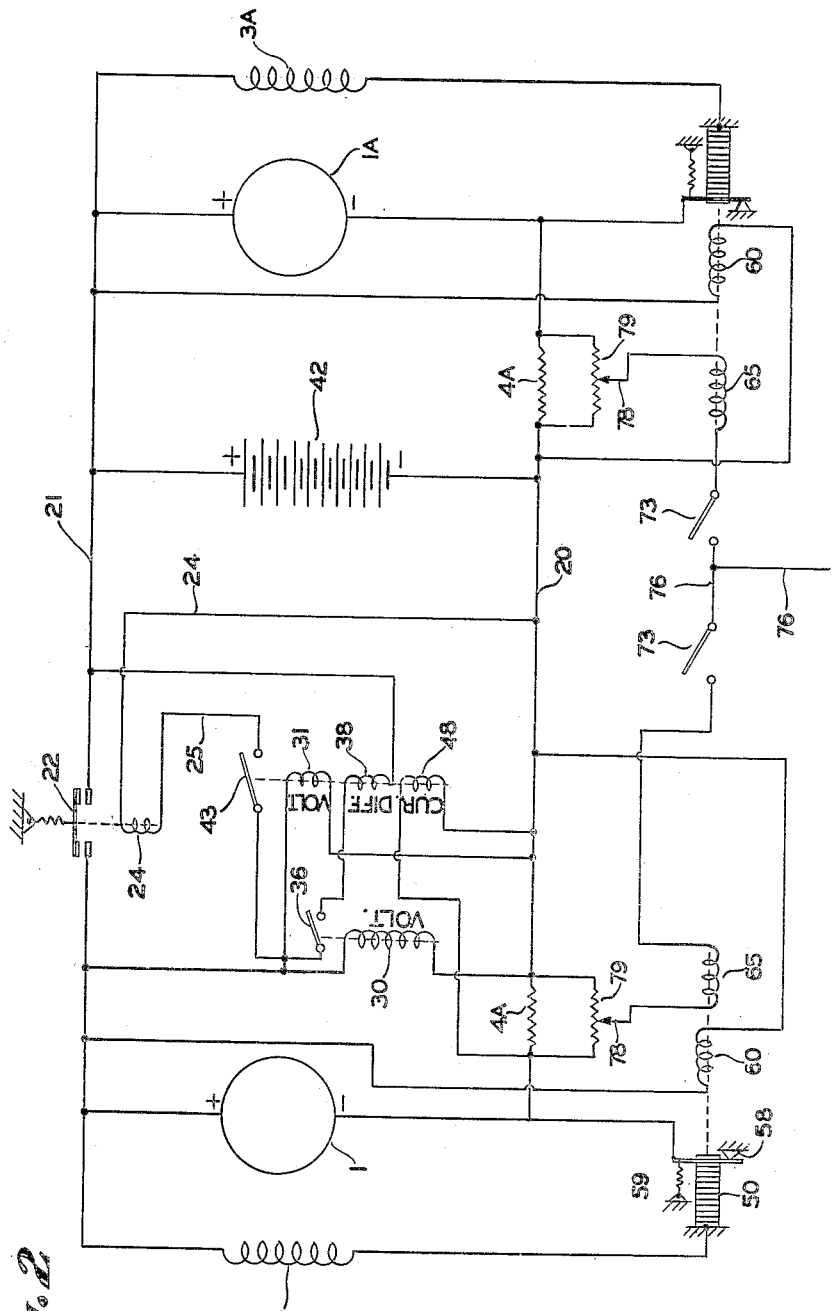

Patented Nov. 27, 1951

2,576,117

UNITED STATES PATENT OFFICE 2,576,117

CONTROL SYSTEM AND DEVICE FOR
DYNAMOELECTRIC MACHINES

William Richards Holmes, New York, N. Y., assignor to Bendix Aviation Corporation, Teterboro, N. J., a corporation of Delaware Application October 10, 1945, Serial No. 621,515

7 Claims. (Cl. 171—119)

The present invention relates to automatic control systems for dynamo electric machines and more particularly to systems for controlling automatically the connection of a plurality of such sources of current in parallel and for regulating said sources and maintaining the load properly divided between the sources after they are connected in parallel.

An object of the invention is to provide a novel system of control for a plurality of sources of current whereby the voltage of the sources of current may be maintained at a substantially constant value including means for momentarily decreasing the voltage setting of the connected sources and increasing the voltage setting of the disconnected sources prior to connection of the same into the load, and said means being arranged so as to effect a predetermined load division between the respective sources by balancing the settings of the respective sources.

Another object of the invention is to provide a novel relay arrangement for controlling the connection of each source of electrical energy to the load, in which the connection of each source to the load is dependent first upon the voltage of the source having a predetermined value and second upon the voltage of the source exceeding that of the load by a predetermined differential.

Another object of the invention is to provide a novel arrangement for varying the datum or voltage setting of the voltage regulating means, including novel relay means for connecting the datum changing means of the regulator of a given source of electrical energy in and out of operative relation, dependent upon the operating condition of the source of electrical energy in relation to the load.

Another object of the invention is to provide a novel means for disconnecting the means for maintaining a predetermined division of load between the sources of electrical energy out of operative relation with a given source, upon failure of said source, so as to thereby automatically protect the system against being adversely affected by the failure of the source.

Another object of the invention is to provide temperature responsive means for varying the generator load in accordance with the operating temperature of the generator.

These and other objects of the invention are pointed out in the following description in terms of the embodiment thereof which is shown in the accompanying drawings. It is to be understood, however, that the drawings are for the purpose of illustration only, and are not designed as a definition of the limits of the invention. Reference being had to the appended claims for this purpose.

Referring to the drawing:

Figure 2 is a diagrammatic view of a second form of the invention and illustrating the operation thereof.

Figure 1:
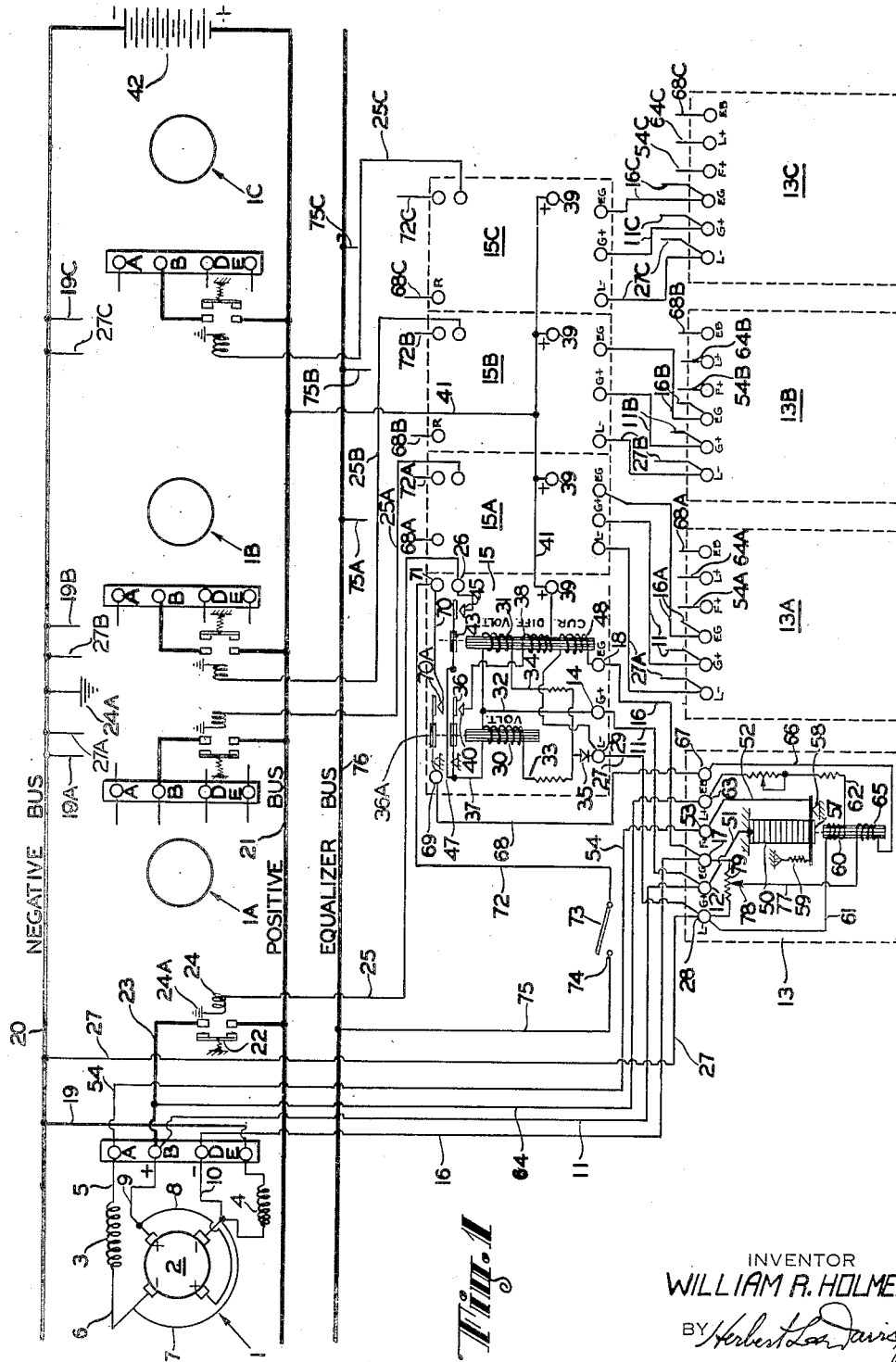
Figure 1 is a diagrammatic view of a system embodying the present invention in which a single control relay and regulator are shown in detail, like control relays and regulators being provided for each generator.

Referring to the drawing, numeral 1 indicates a generator of conventional type including an armature and commutator 2, shunt field winding 3, and interpole compensating winding 4.

The generator 1 has suitable terminals A, B, D and E. The terminal A is connected through a suitable conductor 5 to the shunt field winding 3 while the opposite end of the shunt field winding 3 is connected through a conductor 6 to negative output brushes on the commutator 2 suitably interconnected by a conductor 7. The commutator 2 has also provided positive output brushes suitably interconnected by a conductor 8. The conductor 8 is connected by a conductor 9 to the positive output generator terminal B, while the conductor 7 is connected by a conductor 10 to the negative output generator terminal D. The interpole compensating winding 4 previously noted is connected between the negative conductor 7 and the generator terminal E.

Leading from the positive output terminal B of the generator 1 is a conductor 11 which leads to a terminal 12 on a regulator 13 and terminal 14 on relay control 15. There also leads from the negative output terminal D of the generator 1 a conductor 16 which is connected to regulator terminal 17 and relay control terminal 18.

Leading from the interpole compensating winding terminal E of the generator 1 is a conductor 19 which leads to a negative bus line 20. A positive bus line 21 is connected through a main control relay switch 22 to the positive output terminal B by a conductor 23. The relay switch 22 is controlled by an electromagnetic winding 24 having one end connected through a ground connection 24A to the negative bus line 20. The opposite end of the winding 24 is connected by a conductor 25 to a terminal 26 of the relay control 15. There further leads from the negative bus line 20 a conductor 27 which connects the negative bus line 20 to a regulator terminal 28 and a control relay terminal 29.

Connected across the control relay terminals 14 and 29 or the positive and negative terminals B and E respectively of the generator 1 is a voltage coil 30 and a voltage coil 31 which are connected in parallel to the terminal 14 through a conductor 32 and to the terminal 29 through conductors 33 and 34 and a rectifier 35.

The voltage coil 30 controls spring tensioned switch arms 36 and 36A. The switch arms 36 and 36A close upon energization of the winding 30 by a generator voltage in excess of a predetermined value. The switch arm 36 closes a circuit from conductor 32 through a conductor 37 to a differential winding 38.

The differential winding 38 has one end connected to a relay control terminal 39 while the opposite end is connected to a control contact 40 of the switch 36. The terminal 39 is connected through a conductor 41 to the positive bus line 21.

Across the positive and negative bus lines 20 and 21 there is connected a battery or load 42 having its negative terminal connected to the negative bus line 20 and its positive terminal connected to the positive bus line 21.

The coils 31 and 38 are arranged so as to control the closing of relay spring tensioned switch arm 43 which controls a normally open switch contact 45. The contact 45 is connected to the terminal 26, while the switch arm 43 opens and closes contact 45. The switch arm 43 is connected by conductor 47 to conductor 37 and through conductors 32 and 11 to the positive terminal B of the generator 1. Thus upon switch arm 43 closing contact 45, the electromagnet 24 is energized closing switch 22 and connecting the generator 1 to the bus lines 20 and 21.

The coil 30 is connected across the output terminals B and E of generator 1 and registers the direct voltage of generator 1 and is arranged to close switch arms 36 and 36A at some predetermined value below the normal voltage of bus lines 20 and 21, at for example 26 or 27 volts and opens at a predetermined value below the normal voltage of the battery 42, at for example 22 to 23 volts.

The coil 31 is likewise connected across the output terminals B and E of the generator 1 and registers the voltage of generator 1. The coil 31 is arranged so as not to close relay switch arm 43 below a predetermined voltage, of for example 32 to 34 volts, which voltage is so selected as to always be above the voltage of the bus lines 20 and 21.

The coil 38 is arranged so as to interconnect the positive terminals of the battery 42 and generator 1 upon the closing of switch 36 so as to register the difference in voltage between the generator 1 and battery 42. The coil 38 is so arranged that when the generator voltage exceeds that of the battery 42 or bus lines 20 and 21 by a predetermined value, or above for example a 0.5 voltage differential, the current flow through coil 38 will be in a direction causing the magnetic force of the differential coil 38 to be added to the magnetic force of voltage coil 31 to cause switch arm 43 to close contact 45.

As long as the voltage of battery 42 or the voltage of the bus lines 20 and 21 exceeds that of the generator 1, the switch 43 will not close, since the current flow through coil 38 will be in an opposite direction to that previously described and will tend to counteract the electromagnetic force of the coil 31. When the switch 22 closes it in effect shunts differential coil 38 out of operation.

There is further provided a current coil 48 for controlling the operation of the switch arm 43 jointly with the differential coil 38 upon the closing of switch 36. One end of coil 48 is connected to terminal 18 while the opposite end is connected to terminal 29. Thus, the coil 48 is connected across the interpole winding 4 through conductors 16 and 10, and conductors 27, 20 and 19.

The winding 48 is so wound that should the voltage of generator 1 decrease to a value below that of the bus lines 20 and 21 so that there is a reverse flow of current from the bus lines to the generator, then the magnetic flux of the voltage coil 31 will be such as to decrease the total magnetic force applied to switch arm 43, causing the same to open under the spring force of the switch arm 43. Upon switch arm 43 opening contact 45, the electromagnet 24 is de-energized whereupon switch 22 under spring force disconnects the generator from the bus lines 20 and 21.

The generator 1 is controlled by a voltage regulator 13, including a variable resistance carbon pile element 50 connected at one end by an electrical conductor 51 to terminal 12 and through the conductor 11 to the positive output terminal B of the generator 1. The opposite end of the variable resistance element 50 is connected by conductor 52 to a terminal 53 of the regulator 13. A conductor 54 leads from the terminal 53 to the terminal A of the generator 1 and thereby to the field winding 3 of the generator 1.

Thus the carbon pile 50 regulates the excitation of the field winding 3 of the generator 1. The resistance of the carbon pile 50 is regulated by suitable electromagnetic windings arranged so as to control an armature 57 and thereby the pressure applied to the carbon pile 50 and the resistance thereof.

The regulator is shown diagrammatically in the drawing as including the armature 57 pivoted at 58 and exerting a compressive force upon the carbon pile 50 under tension of the spring 59.

The spring 59 is arranged so as to balance the electromagnetic force applied on the armature 59 by an electromagnetic winding 60 when energized by a voltage having a predetermined value and is preferably of a type such as shown in the patent application Serial No. 570,002 of William G. Neild filed December 27, 1944, now U. S. Patent No. 2,427,805.

The coil 60 is connected at one end by a conductor 61 to the terminal 28 and through conductors 27, 20 and 19 to the terminal E of generator 1. The opposite end of the winding 60 is connected by a conductor 62 to a terminal 63 which in turn is connected by a conductor 64 to the positive output terminal B of the generator 1. Thus the coil 60 responds to output voltage of the generator 1 and is arranged to regulate the carbon pile 50 so as to control the excitation of the field winding 3 of the generator to maintain a predetermined generator output voltage.

A second electromagnetic winding 65 is provided for varying the datum or voltage setting of the winding 60. The winding 65 has one end connected by a conductor 66 to a terminal 67 which is connected by a conductor 68 to a terminal 69 of the control relay 15.

The terminal 69 is connected by a conductor 70 to the spring switch arm 36A controlled by the electromagnetic winding 30. The switch arm 36A is arranged to close a contact 70A upon the voltage of the generator 1 reaching the predetermined value. The contact 70A is connected by conductor 79 to a terminal 71 which is in turn connected by a conductor 72 to a manually operable switch 73. The switch 73 controls a contact 74 connected by conductor 75 to an equalizer bus line 76 for a purpose which will be explained. The switch arm 36A may if desired be controlled by a separate relay indicative of a predetermined generator voltage.

The other end of the compensating coil 65 is connected by a conductor 77 to an arm 78 of a potentiometer and contacting the potentiometer coil 79 at a point intermediate the opposite ends thereof. The opposite ends of the potentiometer coil 79 are connected to terminals 17 and 28, respectively, which in turn connect the potentiometer coil 79 across the interpole compensating winding 4 through conductors 16 and 27, respectively.

The aforenoted arrangement is described and claimed in divisional application Serial No. 155,437, filed April 12, 1950.

A plurality of generators 1; 1A; 1B and 1C are provided. Each of the generators 1A; 1B and 1C has a regulator similar to the regulator 13 of the generator 1 and indicated herein as 13A; 13B and 13C respectively. Likewise the generators 1A; 1B; and 1C have control relays similar to the control relay 15 of the generator 1 and indicated herein as 15A; 15B; and 15C, respectively. For simplicity of illustration, the control and regulator circuit for the generator 1 only has been shown and the corresponding connections for the control and regulator circuits of the generators 1A; 1B; and 1C have been indicated by like numerals bearing a letter A; B; or C corresponding to the respective generator to which the same relates.

Through the arrangement of the potentiometer 79 across the interpole compensating winding 4, the coil 65 connected thereto through conductor 77 is responsive to the voltage drop across the winding 4 so as to decrease or increase the voltage setting of the regulator 13 dependent upon the relative outputs of the several generators.

The coil 65 is further connected to a similar coil in each of the regulators 13A; 13B and 13C through the equalizer bus 75 and conductors 68A; 68B; and 68C and conductors 75A; 75B; and 75C and their respective relay controls 15A; 15B; and 15C, respectively.

The winding in each of the respective regulators 13A; 13B; and 13C corresponding to the winding 65 in regulator 13 is so designed that upon the generator controlled thereby assuming a greater portion of the load than the other generators the voltage drop across the winding 4 of the first mentioned generator will exceed the voltage drop across the winding 4 of the several other generators, whereupon a current will flow in the coil 65 of the regulator for the first mentioned generator in a direction causing an increase in the magnetic force acting upon the armature 57 and increasing the resistance of the carbon pile 50 so as to reduce the voltage produced by the generator controlled thereby. This action will be readily apparent from Figure 2.

The direction of current flow through the compensating coil 65 of the other generators, however, will be in such a direction as to counteract the electromagnetic force of the main control winding 60 so as to cause the spring 59 to draw the armature 57 in a direction for decreasing the resistance of the carbon pile 50 and thereby increase the voltage produced by the generators controlled by the same until the generators are in a balanced relation.

The voltage coils 60 of the regulators 13; 13A; 13B; and 13C of the generators 1; 1A; 1B; and 1C are so calibrated as to regulate their respective generators so as to maintain substantially the same voltage, while the corresponding relays 15; 15A; 15B; and 15C are arranged to connect their respective generators into the bus lines 20 and 21 when their corresponding generators exceed that of the bus lines 20 and 21 by the predetermined differential previously explained.

Thus, the generator first reaching the predetermined differential above that of the battery or bus will be connected into the same.

When any other remaining generator has a voltage sufficient to close the equalizer circuit through switch 36A, the unbalance in voltages tends to decrease the voltage of the first generator and increase the voltage of the second generator due to the fact that the first generator is connected to the load so as to produce a voltage across the interpole compensating winding, while the second generator which is not connected to the load through the switch 22 has a negligible voltage across its interpole compensating winding so that the current flow in the equalizer circuit is such as to decrease the voltage of the first generator and increase the voltage setting of the regulator for the second generator. Thus, upon the voltage generator increasing to a value above the bus voltage by a predetermined differential, the second generator is connected to the load.

The other generators are connected into the load in a similar manner.

During operation of the generators should one tend to overheat the interpole compensating winding may be so designed as to increase its resistance with increase in generator temperature and thereby cause an increase in the voltage drop across the interpole compensating winding 4 causing in turn a flow of current in the equalizer circuit in a direction tending to increase the resistance of the carbon pile 50 and thereby produce a division of load by the several generators so that the generator which is overheated assumes a smaller portion of the load than the remaining generators.

Upon any one of the generators experiencing a decrease in voltage below that of the bus or battery so that there is a reverse flow of current towards the generator, the latter generator will be disconnected from the bus or battery by the action of the reverse current coil 48 which is connected across the interpole compensating winding. Upon arm 43 opening the contact 45 the line switch coil 24 is de-energized causing line switch 22 to open.

Upon opening of line switch 22 there is a negative differential voltage impressed upon coil 38 which tends to cause a further decrease in the pull upon contact arm 43 so as to insure the maintenance of the same in open position.

In Figure 2, there is shown a somewhat modified form of the invention in which there is provided an external resistor 4A in place of the interpole compensating winding 4 previously described. Like numerals on Figure 2 indicate corresponding parts to those previously described with reference to Figure 1 and the interconnection of the compensating windings 65 for the generators 1 and 1A are shown in greater detail.

The control relay for generator 1A has been omitted for purposes of clarity and its operation will be readily understood when considered with the explanation of Figure 1.

Although only two embodiments of the invention have been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. A device for controlling the connection of a generator to a load circuit, comprising, in combination, a first switch member for causing the connection of said generator to said load circuit upon the closure thereof, operating means for said first switch member including a first electromagnetic winding adapted to be energized by the generator voltage, a second electromagnetic winding adapted to be energized by the difference between the generator and load current conditions, a second switch member, operating means for said second switch member including a third electromagnetic winding adapted to be energized by the generator voltage, said second switch member controlling the circuit to said second electromagnetic winding and arranged to close said last mentioned circuit upon a generator voltage in excess of a predetermined value, said second electromagnetic winding arranged so as to act accumulatively with respect to said first electromagnetic winding so as to close said first switch member upon said generator current predominating, said first switch member controlling the circuit to said second electromagnetic winding and arranged so as to shunt said second electromagnetic winding upon actuation to a closed position, a fourth electromagnetic winding adapted to be energized by the current flow through said load circuit and arranged so as to tend to maintain said first switch member in a closed position while said generator current predominates and to effect the opening of said first switch member upon said load current predominating so as to disconnect said generator from the load circuit, another generator connected to said load circuit, a regulator for each of the generators for maintaining a predetermined generator voltage output, said regulators including means for effecting a predetermined division of load between the generators, a third switch member for connecting said load dividing means into operation, and said third electromagnetic winding arranged to operate said third switch member in response to the output voltage of said first mentioned generator.

2. A device for controlling the connection of a generator to a load circuit, comprising, in combination, a first switch member for causing the connection of said generator to said load circuit upon the closure thereof, operating means for said first switch member including a first electromagnetic winding adapted to be energized by the generator voltage, a second electromagnetic winding adapted to be energized by the difference between the generator and load current conditions, a second switch member, operating means for said second switch member including a third electromagnetic winding adapted to be energized by the generator voltage, said second switch member controlling the circuit to said second electromagnetic winding and arranged to close said last mentioned circuit upon a generator voltage in excess of a predetermined value, said second electromagnetic winding arranged so as to act accumulatively with respect to said first electromagnetic winding so as to close said first switch member upon said generator current predominating, said first switch member controlling the circuit to said second electromagnetic winding and arranged so as to shunt said second electromagnetic winding upon actuation to a closed position, a fourth electromagnetic winding adapted to be energized by the current flow through said load circuit and arranged so as to tend to maintain said first switch member in a closed position while said generator current predominates and to effect the opening of said first switch member upon said load current predominating so as to disconnect said generator from the load circuit, a plurality of other generators connected to said load circuit, a regulator for each of the generators for maintaining a predetermined generator voltage output, each of said regulators including means for effecting a predetermined division of load between the generators, a circuit for interconnecting said load dividing means, a third switch member for opening and closing said circuit to the load dividing means of the first mentioned generator, and said third switch member actuated to a closed position by said third electromagnetic winding upon the output voltage of said first mentioned generator exceeding a predetermined value.

3. In combination, a load circuit, a plurality of generators for said load circuit, a regulator associated with each of said generators, electric circuit means interconnecting the regulators of each of said generators so as to maintain a predetermined division of load between the generators, each of said generators having associated therewith a resistor in the load circuit, said resistor arranged so that the resistance thereof may vary in accordance with the operating temperature of its associated generator, and said electric circuit means including a voltage dividing means connected across each of said resistors and responsive to change in the fall of potential across any one of said resistors for varying the division of load in accordance with the relative operating temperatures of the respective generators so as to avoid the overheating thereof.

4. In combination, a load circuit, a plurality of generators for said load circuit, a regulator associated with each of said generators, electric circuit means interconnecting the regulators of each of said generators so as to maintain a predetermined division of load between the generators, each of said regulators having associated therewith a resistor in the load circuit, said electric circuit means including a voltage dividing means connected across each of said resistors and responsive to change in the fall of potential across any one of said resistors for adjusting said regulators so as to maintain a predetermined division of load between said generators, and relay means associated with at least one regulator for disconnecting the regulator from said interconnecting circuit upon the output voltage of the generator associated with the regulator decreasing below a predetermined value.

5. In combination, a load circuit, a plurality of generators for said load circuit, a regulator associated with each of said generators, electric circuit means interconnecting the regulators of each of said generators so as to maintain a predetermined division of load between the generators, relay means associated with at least one generator for connecting said generator into the load circuit upon the generated current of said generator exceeding the load current by a predetermined value, said regulators arranged so as to maintain a predetermined generator voltage, means for varying the voltage setting of each regulator so as to decrease the voltage setting of the regulator of the generator connected to the load circuit and increase the voltage setting of the regulator for said one generator when disconnected from the load circuit so that the relay means associated with the last mentioned generator may effect the connection thereof to the load circuit upon the generated current of the last mentioned generator exceeding the load current by the predetermined value.

6. In combination, a load circuit, a plurality of generators for said load circuit, a regulator associated with each of said generators, electric circuit means interconnecting the regulators of each of said generators so as to maintain a predetermined division of load between the generators, relay means associated with at least one generator for connecting said generator into the load circuit upon the generated current of said generator exceeding the load current by a predetermined value, said regulators arranged so as to maintain a predetermined generator voltage, means for varying the voltage setting of each regulator so as to decrease the voltage setting of the regulator of the generator connected to the load circuit and increase the voltage setting of the regulator for said one generator when disconnected from the load circuit so that the relay means associated with the last mentioned generator may effect the connection thereof to the load circuit upon the generated current of the last mentioned generator exceeding the load current by the predetermined value, and said voltage varying means arranged so as to maintain a predetermined division of load between said generators when connected to the load circuit.

7. In combination, a load circuit, a plurality of generators for said load circuit, a regulator associated with each of said generators, electric circuit means interconnecting the regulators of each of said generators so as to maintain a predetermined division of load between the generators, relay means associated with each generator for connecting said generators into the load circuit upon the generated current exceeding the load current by a predetermined value, said regulators arranged so as to maintain a predetermined generator voltage, means for varying the voltage setting of each regulator so as to decrease the voltage setting of the regulators of those generators connected to the load circuit and increase the voltage setting of the regulators for those generators disconnected from the load circuit so that the relay means associated with the last mentioned generators may affect the connection thereof to the load circuit upon the generated current of the last mentioned generators exceeding the load current by the predetermined value, said voltage varying means arranged so as to maintain a predetermined division of load between those generators connected to the load circuit, and means including electromagnetic windings responsive to the voltages of the associated generators for disconnecting said voltage setting varying means from any one of said regulators upon the voltage produced by the associated generator decreasing below a predetermined minimum value.

WILLIAM RICHARDS HOLMES.

REFERENCES CITED

The following references are of record in the file of this patent:

UNITED STATES PATENTS

| Number | Name | Date |
|---|---|---|
| 574,914 | Lamme | Jan. 12, 1897 |
| 1,792,269 | Bany | Feb. 10, 1931 |
| 2,166,187 | Stivender | July 18, 1939 |
| 2,278,770 | Creveling | Apr. 7, 1942 |
| 2,401,795 | Rady | June 11, 1946 |
| 2,420,922 | Walley | May 20, 1947 |